United States Patent [19]

Hageman

[11] Patent Number: 5,056,967
[45] Date of Patent: Oct. 15, 1991

[54] SPOTWELD REMOVAL TOOL

[75] Inventor: David C. Hageman, Chagrin Falls, Ohio

[73] Assignee: Premier Industrial Corporation, Cleveland, Ohio

[21] Appl. No.: 558,656

[22] Filed: Jul. 27, 1990

Related U.S. Application Data

[63] Continuation of Ser. No. 330,113, Mar. 28, 1989, abandoned.

[51] Int. Cl.⁵ .............................................. B23B 51/02
[52] U.S. Cl. .................................... 408/230; 408/199
[58] Field of Search ............... 408/230, 229, 149, 212, 408/223, 224, 211, 704, 705, 228, 43, 210; 76/108.6

[56] References Cited

U.S. PATENT DOCUMENTS 2,193,186  3/1940  Bannister .......................... 76/108 T
2,332,295  10/1943  Bouchal .

FOREIGN PATENT DOCUMENTS 278288  8/1988  European Pat. Off. ............ 408/199
2193913  2/1988  United Kingdom .
2201910  9/1988  United Kingdom .

OTHER PUBLICATIONS

Drilling Technology, pp. 32-34, 1977.

*Primary Examiner*—Larry I. Schwartz
*Assistant Examiner*—Robert Schultz
*Attorney, Agent, or Firm*—Jones, Day, Reavis & Pogue

[57] ABSTRACT

Disclosed is a spotweld removal tool adapted for removing spotwelds which join two or more layers of sheet metal to thereby free the sheet metal layers from one another. The spotweld removal tool comprises a split point twist drill having a central cutting tip (38) having leading edges (44 and 46) and defined by flared walls (56 and 58), recessed surfaces (64 and 66) adjoining the flared walls and peripheral cutting flats (40 and 42).

9 Claims, 2 Drawing Sheets

1

SPOTWELD REMOVAL TOOL

This is a continuation of application Ser. No. 07/330,113, filed Mar. 28, 1989 and now abandoned.

BACKGROUND OF THE INVENTION

1. Field of the Invention

The present invention relates to specialized sheet metal cutting tools and, more particularly, relates to a tool having a point configuration and design uniquely suited to removal of spotwelds which join two or more layers of sheet metal, thereby freeing the sheet metal layers from one another.

2. State of the Prior Art

A construction technique frequently used in the automobile industry and other industries involves joining prefabricated sheet metal parts together using a series of spotwelds which are spaced along the mating edges of the prefabricated sheet metal parts. This is particularly common among modern automobile manufacturers who often join structural elements and body parts together by using hundreds of spotwelds.

Occasionally it becomes necessary in automobile and other applications to separate such spotwelded parts. This most commonly occurs when one of the parts has been damaged such as when an exterior fender panel or door panel of an automobile has been damaged as a result of an accident. In such circumstances, it becomes necessary to remove the damaged piece quickly and easily and with minimum damage to the remaining structure so that a replacement piece can be welded in place.

One of the common prior art tools used for this task is an air powered chisel. The tip of such a chisel is forced between the mating surfaces of the sheet metal in the region of the spotweld and the lead edge of the chisel is aimed toward the spotweld. When activated, the power chisel drives forward and literally rips the welded metal apart. This process has the shortcoming that it is quite loud and jarring to the operator. More importantly, this technique has a dangerous tendency to distort the piece of sheet metal that is left behind. This distortion may lead to problems because it may prevent the replacement piece of sheet metal from fitting properly to the remaining structure.

A second prior art technique involves the use of the tool shown in FIGS. 5A and 5B. The tool resembles a milling bit with an aperture in the middle of the bit. The aperture is approximately the correct size to accommodate a typical spotweld. The cutting region of the tool, therefore, is in the shape of an annulus which surrounds the spotweld. The tool of FIG. 5A and 5B sometimes is provided with either a spring-loaded awl or a conventional steel drillbit in the center of the tool aperture to assist with centering. This tool has several shortcomings. When an awl is used, the tool is difficult to control. It tends to skate across the surface of the sheet metal, particularly when the tool is not perfectly perpendicular to the sheet metal surface. If a drillbit is used in the center of the tool, the drillbit helps to maintain the center and assists the operator by tending to pull the milling teeth into contact with the work surface. However, it also proceeds to drill through both pieces of sheet metal into whatever may be found behind the sheetmetal.

Equally important, the tool of FIGS. 5A and 5B leaves a series of small "discs" on the structure that are left behind after all of the spotwelds have been milled and the damaged piece of sheetmetal has been removed. These "discs" are left behind because the region of the tool with the cutting edges cuts a doughnut-shaped hole through one of the sheet metal layers. The spotweld location, however, remains partially or completely intact. Therefore, when using the tool of FIG. 5A and 5B, an additional operation is needed to prepare the remaining surface for a replacement part. This is frequently done with a grinder, which has at least two significant shortcomings. First, it is extremely noisy and messy. Second, a great deal of heat is generated in the vicinity of the spotweld by the grinding friction and this heat is rapidly conducted to the nearby sheetmetal. This can have the effect of deteriorating the metallurgical properties of the sheet metal in that region. It also can have the negative effect of melting and releasing rustproofing materials attached to the metal in that area.

SUMMARY OF THE INVENTION

The problems encountered with the prior art techniques and tools have been overcome by the present invention which provides a modified point configuration drilling tool including uniquely shaped cutting edges and points. The spotweld removal tool, according to the present invention, is characterized by a split point center drilling tip surrounded by a shearing surface which itself is surrounded by two milling flats.

It is an object of the present invention to provide an improved tool for separating spotwelded sheet metal parts by removing the spotwelds. Another object is to provide a spotweld removal tool which is easy to maintain on center and easy to operate. It is a further object to provide a spotweld removal tool which does the least amount of damage to the remaining sheet metal. Other objects and advantages will be apparent to those skilled in the art upon reading the disclosure below.

DETAILED DESCRIPTION OF A PREFERRED EMBODIMENT

Figure 1:
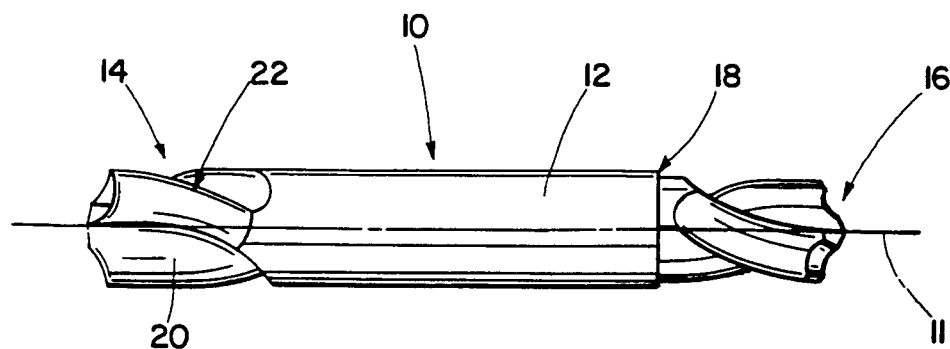
FIG. 1 is a side elevation of a tool according to the present invention.

Referring to FIG. 1, at 10 there is shown a spotweld removal tool constructed according to a preferred embodiment of the present invention. It is made of hardened steel and has a substantially cylindrical center body portion 12 and two end portions 14 and 16. End portions 14 and 16 have virtually identical features and differ only in that end portion 16 is a smaller diameter than end portion 14. Accordingly, there exists a shoulder 18 adjacent end portion 16 on the end of the cylindrical body 10. The diameters of end portions 14 and 16 are selected based upon standard spotweld dimensions. Referring to end portion 14 as a typical example, the end portion has helical flutes 20 and 22, which extend from the body 12 to the working end 24.

Figure 2:
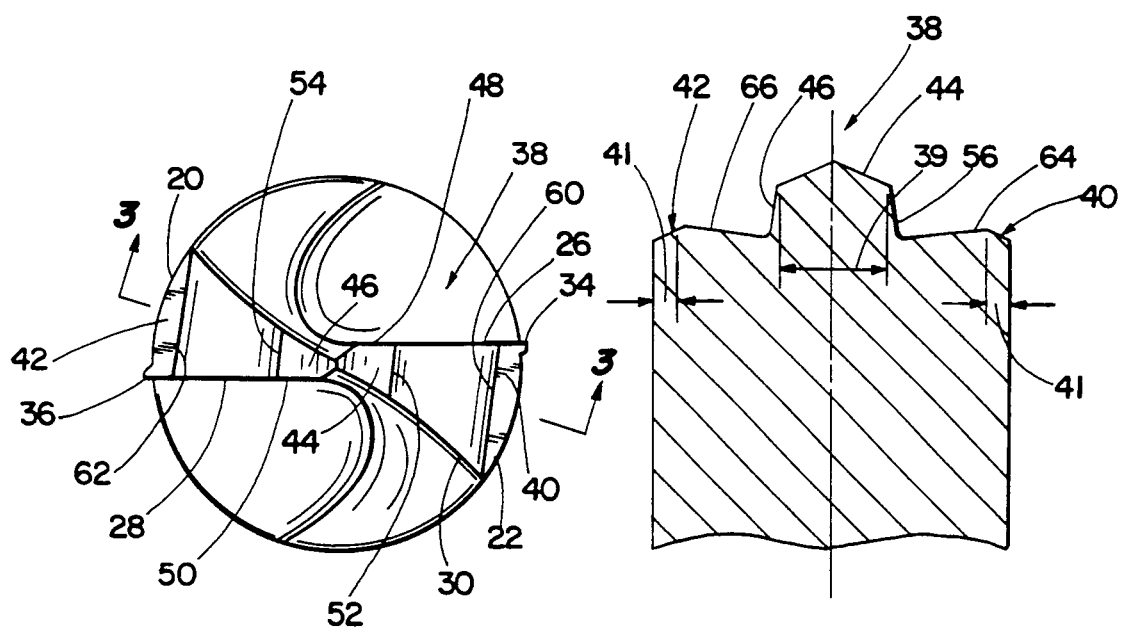
FIG. 2 is an end view of the spotweld removal tool of FIG. 1.

Referring to FIG. 2, the critical features and surfaces of the working end 24 can be seen. As shown in FIG. 2, lands 20 and 22 comprise leading edges 26 and 28 and trailing edges 30 and 32. Adjacent each leading edge 26 and 28 on the outer surface of each land there exist cutting margin portions 34 and 36 which extend farther from the central axis 11 than the remaining portions of the outer 20 surfaces 20 and 22 of the lands. The cutting margin portions represent the largest diameter on the tool and prevent binding.

Figure 3:
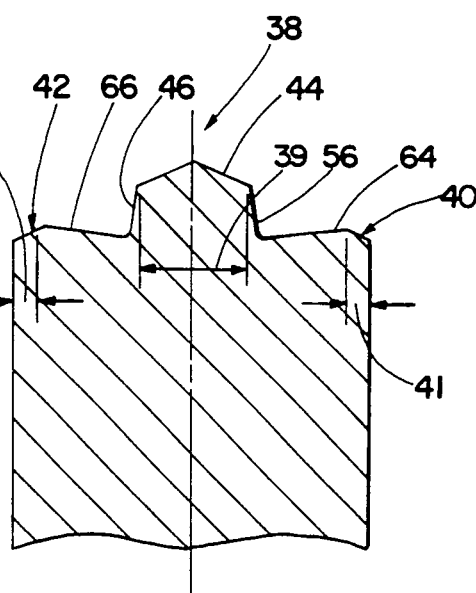
FIG. 3 is a cross sectional view of the spotweld removal tool taken along section line A—A.

Referring to FIGS. 2 and 3 there is shown a central cutting tip 38 and two peripheral cutting flats 40 and 42. Central cutting tip 38 comprises two cutting surfaces 44 and 46 which have leading edges 48 and 50 and outer edges 52 and 54, respectively. The cutting surfaces 44 and 46 are disposed in a relation to each other that is commonly referred to in drill bit terminology as a "split-point" tip. In the preferred embodiment, the working ends 14 and 16 are a modified version of a 135° split point drill tip. The outer edges 52 and 54 are defined by roughly vertical walls 56 and 58, shown in FIG. 3, and are disposed such that the angle between the leading edge and its associated outer edge is less than 90 degrees as viewed in FIG. 2. That is, the angle between surface 48 and outer edge 52 of cutting surface 44 is less than 90 degrees, and the angle between leading edge 50 and 54 of cutting surface 46 is less than 90 degrees.

In the preferred embodiment, the peripheral cutting flats 40 and 42 are coplanar with central cutting surfaces 44 and 46, respectively. The peripheral cutting flats 40 and 42 have interior edges 60 and 62, respectively, which are defined by the recessed surfaces 64 and 66. Recessed surfaces 64 and 66 extend laterally from the central axis 11 beginning at walls 56 and 58. Recessed surfaces 64 and 66 are disposed so as to slope upward slightly when viewed in a direction moving away from central axis 11. Surfaces 56 and 58 are disposed to flare outward slightly as viewed moving from the top to bottom in FIG. 3. This feature prevents the tool from advancing too readily through the sheet metal thus permitting the cutting surfaces 40 and 42 to do their job without binding. This feature also is important in preventing sudden cut through of the second panel. This feature also contributes to the sensation explained below whereby the operator can sense when he has completed removal of the spotweld connecting the sheetmetal pieces. It has been found that it is best for these walls to vary from the vertical axis 11 in the range from approximately 5 degrees to 20 degrees, and preferably in the range of 8 to 12 degrees.

Figure 4:
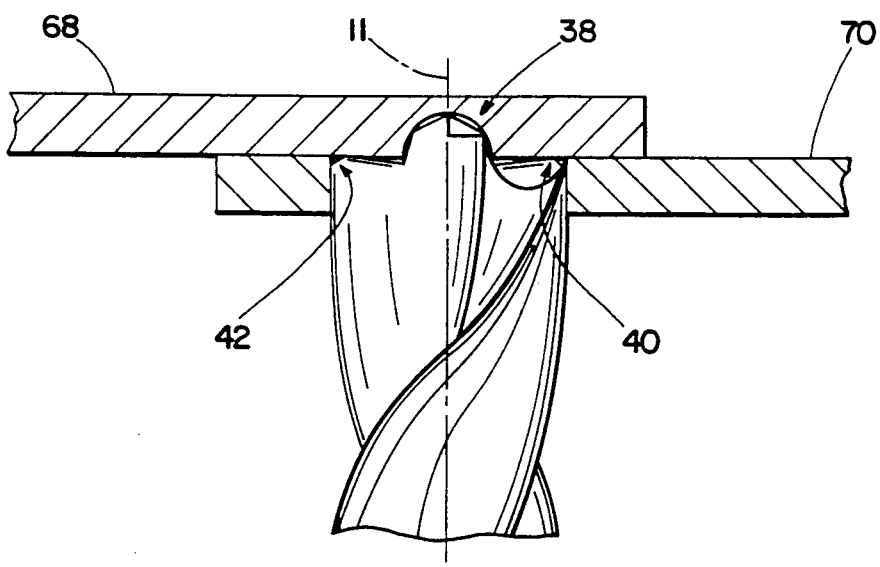
FIG. 4 is a cross sectional view of two layers of sheet metal with a tool according to the present invention shown approximately at the conclusion of spotweld removal.
Figure 5A:
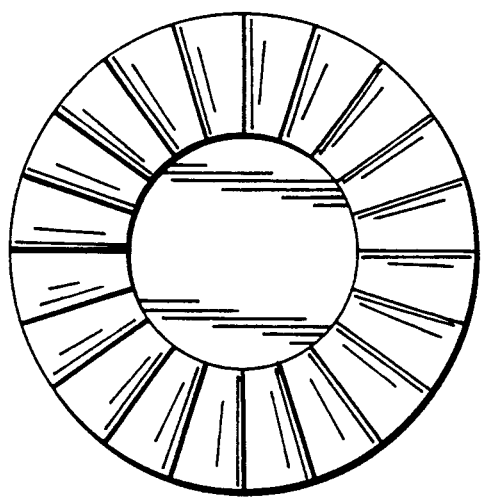
FIG. 5A is a top view of a prior art tool used to remove spotwelds.
Figure 5B:
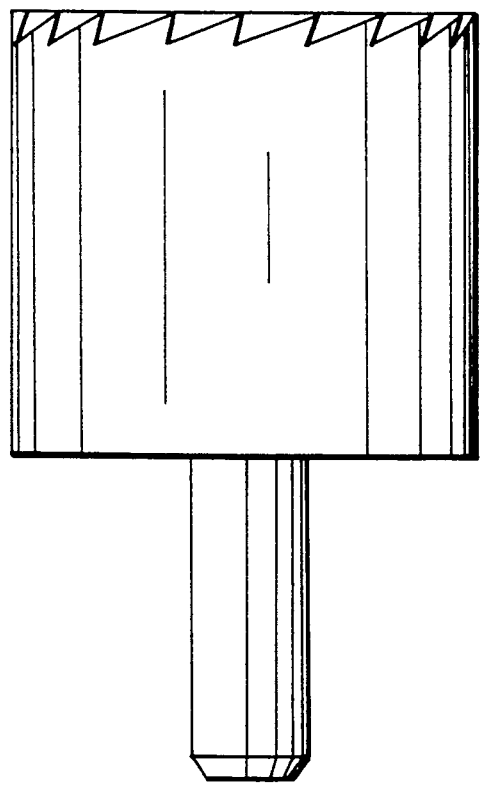
FIG. 5B is a side view of the prior art tool used to remove spotwelds.

Referring now to FIG. 4, the operation of the present invention can be seen. FIG. 4 shows two sheetmetal pieces 68 and 70 previously held together by a spotweld at the location of central axis 11 of the present invention. Central cutting tip 38 is shown to have cut completely through sheetmetal piece 70 and into sheetmetal piece 68. Peripheral cutting flats 40 and 42 are shown to have just completed cutting sheetmetal piece 70 and first come in contact with sheetmetal piece 68. This is the point at which the tool has completed the removal of the spotweld joining pieces 68 and 70, thus permitting pieces 68 and 70 to be separated. It should be noted that central cutting tip 38 has not yet protruded through sheetmetal piece 68.

The spotweld removal tool according to the present invention has several advantages over other spotweld removing means. The split point cutting surface configuration found at the central cutting tip 38 performs well for centering the tool and preventing it from walking across the sheetmetal surface at the beginning of the operation. The recessed surfaces 64 and 66, located between the central cutting tip 38 and the peripheral cutting flats 40 and 42 combined with the flaring of surfaces 56 and 58 eliminate the tendency found in some prior art tools such as conventional drill bits to grab the sheetmetal and propel itself completely through the working surface. In the absence of such a grabbing effect, the operator is required to apply moderate pressure to the tool 10 as it rotates in order that the central cutting tip 38 will proceed through the spotweld and in order that the peripheral cutting flats 40 and 42, together with the recessed surfaces 64 and 66, will shave away the outer regions of the spotweld and the first sheetmetal layer 70.

A particularly noteworthy and unexpected result of the present invention is that the operator is able to sense when the tool has freed the sheetmetal strip 70 from the sheetmetal strip 68. A slight jump can be felt from the tool of the present invention by the operator when the tool completes the removal of the spotweld and the separation of the sheetmetal pieces. This separation signals the operator to stop. The cause of this sensation is not thoroughly understood but is thought to result from the angle of walls 56 and 58 from the vertical and from the angle of surfaces 64 and 66. It should be noted that while these surfaces are depicted as discrete planar surfaces in FIGS. 1 through 4, slightly arcuate surfaces would provide similar performance. This feature has the significant advantage of preventing the operator from proceeding all the way through the second sheetmetal surface 68 and thereby creating an additional rustpoint and weakness in the sheetmetal. The present design has the added advantage of providing good tool life compared to prior art spot weld removal tools and compared to drill configurations such as spur point.

It has been found that the relative sizes between the cutting surfaces 44 and 46 of the central cutting tip 38 and the peripheral cutting flats 40 and 42 are important to obtaining the desirable operating characteristics described above. In the case of conventional spotwelds, a tool diameter of 5/16 of an inch or ⅜ of an inch is typical of the working ends 14 and 16. It has been found that the central cutting tip 38 should span a portion of the diameter of the working end, as shown by reference numeral 39, in the range of 25 to 50 percent, and preferably in the range of 30 to 40 percent. It also has been found that the total portion of the diameter occupied by the peripheral cutting flats 40 and 42, as shown by reference numeral 41, should be in the range of 5 to 25 percent, and preferably in the range of 8 to 15 percent. When these values become too small, the cutting surfaces are short lived and when they become too large, the tool loses the advantageous operating features described above.

The foregoing description of a preferred embodiment has been presented for purposes of illustration and description. The description is not intended to be exhaustive or to limit the invention to the precise form disclosed. Many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

What is claimed is:

1. A split point twist drill including a generally cylindrical body having a predetermined diameter, an outer periphery, a longitudinal axis and first and second opposite ends, at least said first end including a cutting tip coincidental with said axis and having a pair of generally opposite cutting tip surfaces extending outwardly away from said axis and sloping toward said second end, each of said cutting tip surfaces having a leading edge and an outer edge intersecting one another at an included angle along said surface of less than 90°, each of said cutting tip surfaces sloping away from a perpendicular relationship with said axis and toward said second end at a common angle between 5°–20°, said cutting tip surfaces together across said outer edges thereof spanning between 25–50% of said predetermined diameter of said body, said cutting tip including a pair of generally opposite walls extending outwardly from said outer edges of said cutting tip surfaces toward said second end, each of said walls flaring outwardly slightly in a direction from said outer edges of said cutting tip surfaces toward said second end, each of said walls being inclined outwardly away from a parallel relationship with said axis at a common angle between 5°–20°, a pair of generally opposite generally flat surfaces adjacent said outer periphery of said body, each of said generally flat surfaces having an inner edge spaced inwardly toward said axis from said outer periphery, each said generally flat surface sloping from said inner edge thereof away from a perpendicular relationship with said axis toward said second end at a common shallow angle, said generally flat surfaces together spanning between 5–25% of said diameter of said body, a pair of generally opposite recessed surfaces extending between said walls and said inner edges of said generally flat surfaces, each of said recessed surfaces sloping outwardly from its associated said wall away from a perpendicular relationship with said axis and away from said second end at a common angle between 5–20%, said recessed surfaces having leading cutting edges and trailing edges that gradually diverge from one another continuously in a direction extending from said longitudinal axis toward said outer periphery.

2. The drill of claim 1 wherein all of said angles between 5°–20° are between 8°–12°.

3. The drill of claim 1 wherein said cutting tip surfaces together across said outer edges thereof span between 30–40% of said diameter of said body.

4. The drill of claim 1 wherein said generally flat surfaces together span between 8–15% of said diameter of said body, and said shallow angle at which each of said generally flat surfaces slopes from said inner edge thereof away form a perpendicular relationship with said longitudinal axis toward said second end is between 5°–20°.

5. The drill of claim 4 wherein said tip cutting surfaces are substantially coplanar with said generally flat surfaces.

6. The drill of claim 4 wherein all of said angles between 5°–20° are between 8°–12°.

7. A split point twist drill including a generally cylindrical body having a predetermined diameter, an outer periphery, a longitudinal axis and first and second opposite ends, at least said first end having a cutting tip coincidental with said axis and having a pair of generally opposite cutting tip surfaces extending outwardly from said axis and inclined toward said second end at common shallow angles, said cutting tip surfaces together spanning between 30–40% of said predetermined diameter, said cutting tip surfaces having outer edges, a pair of generally opposite walls flaring outwardly from said outer edges of said cutting tip surfaces in a direction toward both said opposite end and said outer periphery, a pair of generally opposite generally flat cutting surfaces adjacent said outer periphery and spaced along said axis toward said second end from said cutting tip surfaces, said flat cutting surfaces sloping inwardly from said outer periphery at shallow angles in a direction away from said second end, said flat cutting surfaces together spanning between 8–15% of said diameter of said body, and a pair of generally opposite recessed surfaces extending between said walls and said flat cutting surfaces, said recessed surfaces sloping at shallow angles in an opposite direction from the direction of slope of said cutting tip surfaces and said flat cutting surfaces, said recessed surfaces having leading cutting edges and trailing edges that gradually diverge continuously in a direction extending from said longitudinal axis toward said outer periphery.

8. The drill of claim 7 wherein said cutting tip surfaces are substantially coplanar with said flat cutting surfaces.

9. The drill of claim 7 wherein cutting tip surfaces, said recessed surfaces and said flat cutting surfaces have substantially coincidental leading cutting edges on generally opposite sides of said cutting tip, said flat cutting surfaces having cutting margin portions adjacent said leading cutting edges extending outwardly slightly beyond said outer periphery of said body.

* * * * *